United States Patent
Hu et al.

(10) Patent No.: US 7,711,000 B2
(45) Date of Patent: May 4, 2010

(54) SYSTEM FOR CONFIGURING NETWORK ELEMENTS

(75) Inventors: Cheng-Hong Hu, San Ramon, CA (US); Chou Lan Pok, San Ramon, CA (US); Michael Raftelis, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 175 days.

(21) Appl. No.: 11/834,072

(22) Filed: Aug. 6, 2007

(65) Prior Publication Data

US 2009/0041026 A1    Feb. 12, 2009

(51) Int. Cl.
*H04J 3/22* (2006.01)
(52) U.S. Cl. .................. 370/465; 370/464; 709/226
(58) Field of Classification Search .................. 370/465, 370/468, 401, 328, 252; 709/226
See application file for complete search history.

(56) References Cited

U.S. PATENT DOCUMENTS

| | | | |
|---|---|---|---|
| 6,393,474 B1 * | 5/2002 | Eichert et al. ................ 709/223 |
| 6,459,702 B1 | 10/2002 | Saaverda et al. | |
| 6,854,014 B1 * | 2/2005 | Amin et al. .................. 709/227 |
| 7,114,175 B2 * | 9/2006 | Lahteenmaki .................. 726/4 |
| 7,117,195 B2 * | 10/2006 | Chantrain et al. .............. 707/1 |
| 7,289,534 B1 * | 10/2007 | Bailey et al. ................ 370/468 |
| 7,392,050 B2 * | 6/2008 | Svensson et al. ........... 455/435.3 |
| 2002/0101881 A1 * | 8/2002 | Sundaresan et al. ......... 370/468 |
| 2002/0122422 A1 * | 9/2002 | Kenney et al. .............. 370/392 |
| 2002/0169975 A1 | 11/2002 | Good | |
| 2003/0061068 A1 * | 3/2003 | Curtis ........................... 705/1 |
| 2003/0083988 A1 * | 5/2003 | Reith .......................... 705/40 |
| 2004/0116117 A1 | 6/2004 | Ahvonen et al. | |
| 2004/0172658 A1 * | 9/2004 | Rakib et al. ................ 725/120 |
| 2004/0181690 A1 * | 9/2004 | Rothermel et al. .......... 713/201 |
| 2004/0230681 A1 * | 11/2004 | Strassner et al. ............ 709/226 |
| 2005/0257244 A1 | 11/2005 | Joly et al. | |
| 2006/0075102 A1 * | 4/2006 | Cupit ......................... 709/225 |

(Continued)

FOREIGN PATENT DOCUMENTS

WO    0215462    2/2002

OTHER PUBLICATIONS

Pok et al., "Method and Apparatus for Managing Services in a Communication System", U.S. Appl. No. 11/462,853 dated Aug. 7, 2006, 20 pages.

(Continued)

*Primary Examiner*—Chi H Pham
*Assistant Examiner*—Robert Lopata
(74) *Attorney, Agent, or Firm*—Eduardo Guntin; Andrew Gust; Akerman Senterfitt (57) ABSTRACT

A system that incorporates teachings of the present disclosure may include, for example, a network policy manager having a controller element to provision one or more network elements in a communication system with at least one base policy template and at least one atomic policy template retrieved from one or more base policy templates and a plurality of atomic policy templates according to a service order of a subscriber. At least one base policy template can correspond to an operating baseline of the one or more network elements, while at least one atomic policy template can correspond to one among a plurality of service configurations of the one or more network elements. Additional embodiments are disclosed.

20 Claims, 6 Drawing Sheets

U.S. PATENT DOCUMENTS

| | | | |
|---|---|---|---|
| 2007/0133597 A1* | 6/2007 | Frantz | 370/465 |
| 2007/0140113 A1* | 6/2007 | Gemelos | 370/229 |
| 2007/0150480 A1* | 6/2007 | Hwang et al. | 707/10 |
| 2007/0199039 A1* | 8/2007 | Diroo et al. | 725/134 |
| 2008/0031135 A1* | 2/2008 | Pok et al. | 370/235 |
| 2008/0043719 A1* | 2/2008 | Pok et al. | 370/352 |
| 2008/0066126 A1* | 3/2008 | Walter et al. | 725/97 |
| 2008/0091793 A1* | 4/2008 | Diroo et al. | 709/217 |
| 2008/0144513 A1* | 6/2008 | Small et al. | 370/238 |
| 2008/0151931 A1* | 6/2008 | Moran et al. | 370/465 |
| 2008/0279112 A1* | 11/2008 | Schryer et al. | 370/252 |
| 2008/0319857 A1* | 12/2008 | Dobbins et al. | 705/14 |
| 2009/0040939 A1* | 2/2009 | Van Slyke et al. | 370/252 |
| 2009/0041026 A1* | 2/2009 | Hu et al. | 370/395.21 |

OTHER PUBLICATIONS

Pok et al., "Method and Apparatus for Generating Configuration Information for a Communication System", US. Appl. No. 11/462,864 dated Aug. 7, 2006, 19 pages.

* cited by examiner

Table 1

| Service | Maximum lines/streams | Service Order Options |
|---|---|---|
| VoIP | 4 | 1+4 |
| Video SD | 6 | 1+6 |
| Video HD | 3 | 1+3 |
| HSIA | 1 | 1+6 |
| BYOP | 1 (Y/N) | 1+3 |

Table 2

| HSIA Profiles | Downstream (W) | Upstream (D) |
|---|---|---|
| #1 | 1-1.5Mbps | 384kbps-1Mbps |
| #2 | 1.5-3 Mbps | 384kbps-1Mbps |
| #3 | 3-6 Mbps | 512kbps-1Mbps |
| #4 | 6-10 Mbps | 1-3Mbps |
| #5 | 10-15 Mbps | 1-3Mbps |
| #6 | 15-20 Mbps | 1-3Mbps |

SYSTEM FOR CONFIGURING NETWORK ELEMENTS

FIELD OF THE DISCLOSURE

The present disclosure relates generally to communication systems, and more specifically to a system for configuring network elements.

BACKGROUND

Typically service providers of telecommunication communication services today manually enter service definitions and associated network configuration information for enabling service bundles in a communication system. As high bandwidth infrastructure such as fiber to the curb or home (FTTC or FTTH) continues to be deployed, the number of service bundles possible is growing rapidly. Consequently, entering a large volume of service bundle definitions and corresponding network configuration manually can be error prone and inefficient.

DETAILED DESCRIPTION

In one embodiment of the present disclosure, a computer-readable storage medium in a network policy manager can have computer instructions for recording one or more base policy templates and a plurality of atomic policy templates for provisioning one or more network elements of a communication system. Each of the one or more base policy templates can correspond to an operating baseline of the one or more network elements. Each of the plurality of atomic policy templates can correspond to one among a plurality of service configurations of the one or more network elements. At least one of the one or more base policy templates can be combined with at least one of the plurality of atomic templates when provisioning the one or more network elements. The storage medium can further include computer instructions for receiving a service order associated with a select one of the plurality of services configurations requested by a subscriber, retrieving according to the service order at least one base policy template and at least one atomic policy template, and provisioning the one or more network elements according to the at least one base policy template and the at least one atomic policy template.

In one embodiment of the present disclosure, a network policy manager can have a controller element to provision one or more network elements in a communication system with at least one base policy template and at least one atomic policy template retrieved from one or more base policy templates and a plurality of atomic policy templates according to a service order of a subscriber.

In one embodiment of the present disclosure, a network element can have a controller element to receive provisioning information from a network policy manager (NPM) in the form of at least one base policy template and at least one atomic policy template selected by the NPM from one or more base policy templates and a plurality of atomic policy templates according to a service order of a subscriber.

Figure 1:
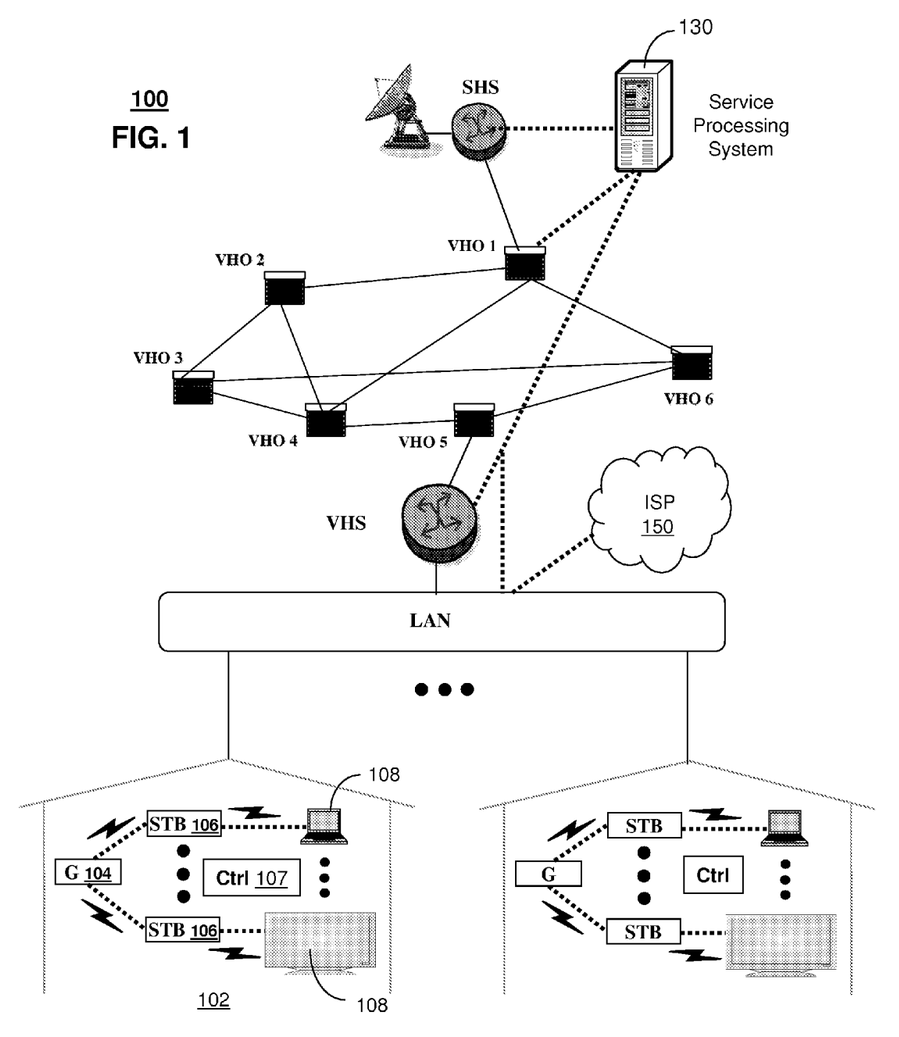
FIGS. 1-2 depict exemplary block diagrams of communication systems.

FIG. 1 depicts an exemplary embodiment of a communication system 100 employing an Internet Protocol Television (IPTV) broadcast media architecture. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system 100 for services such as video-on-demand (VoD).

Each of the subscribers in buildings 102 of communication system 100 can also have access to an Internet Service Provider (ISP) 150. The ISP 150 in some instances can be the same service provider of communication system 100.

A service processing system 130 utilizing common computing and communication technologies can be coupled to one or more of the sub-network elements of the IPTV system to provision network elements therein as will be described shortly.

Figure 2:
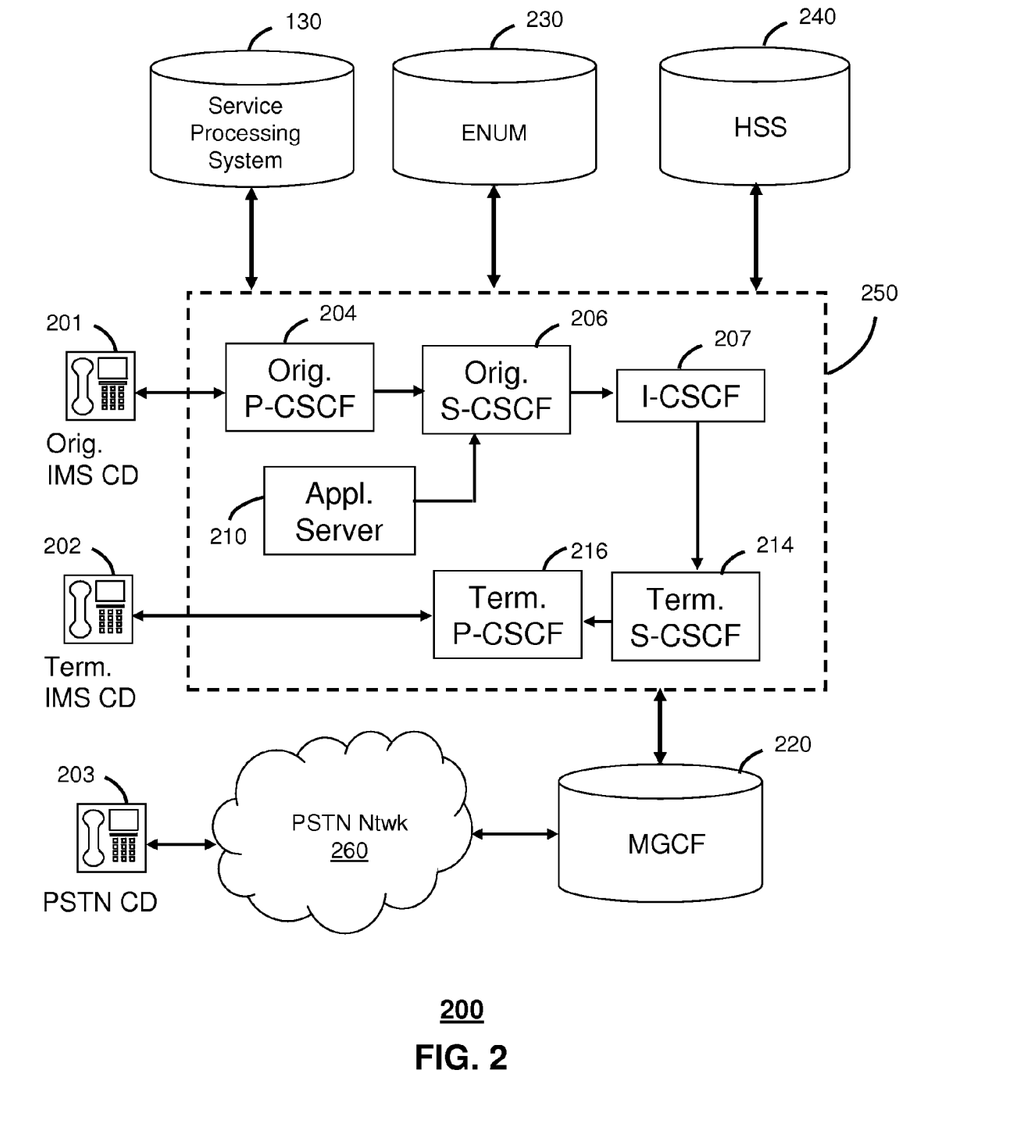

FIG. 2 depicts an exemplary embodiment of a communication system 200 employing an IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260.

IMS CDs 201, 202 register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

During a call setup, an originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 has a successful address resolution it returns a SIP URI. The SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on another application server similar to reference 210 to perform the originating treatment telephony functions mentioned earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

The IMS network 250 can also be coupled to the service processing system 130 previously described in FIG. 1. In this context, the service processing system 130 can be utilized to provision triple play services such as video, voice and Internet services.

Figure 3:
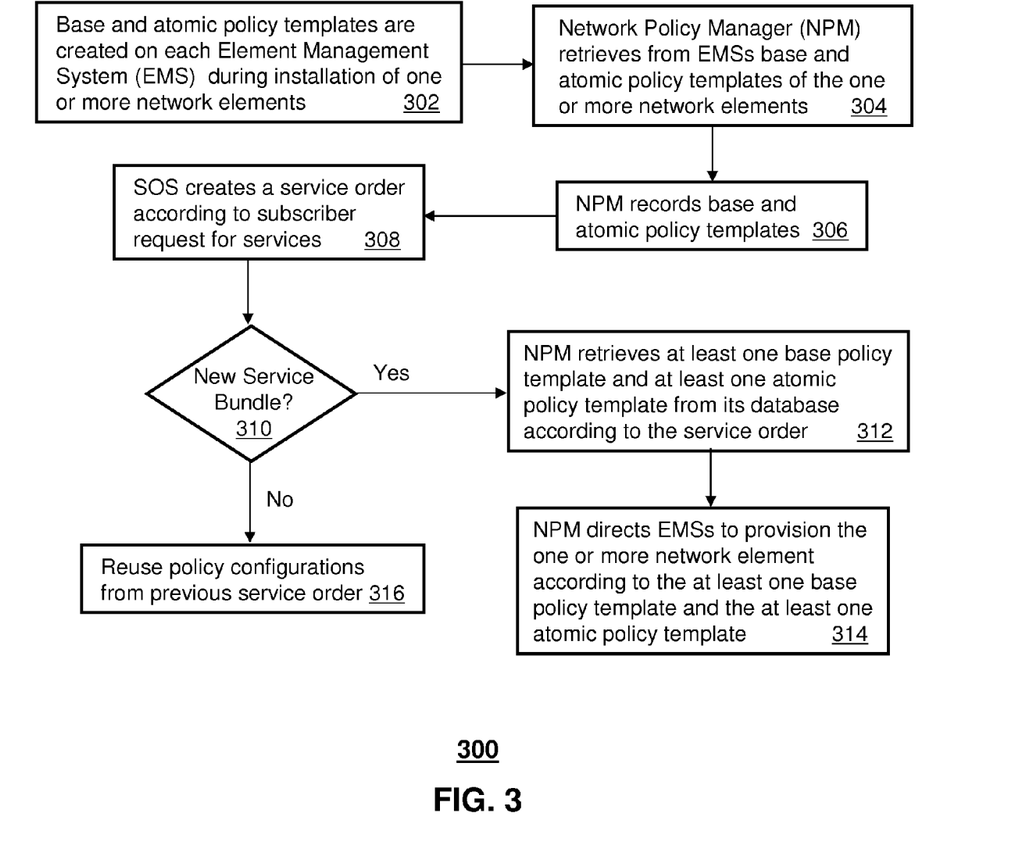
FIG. 3 depicts an exemplary method operating in portions of the communication systems.
Figure 4:
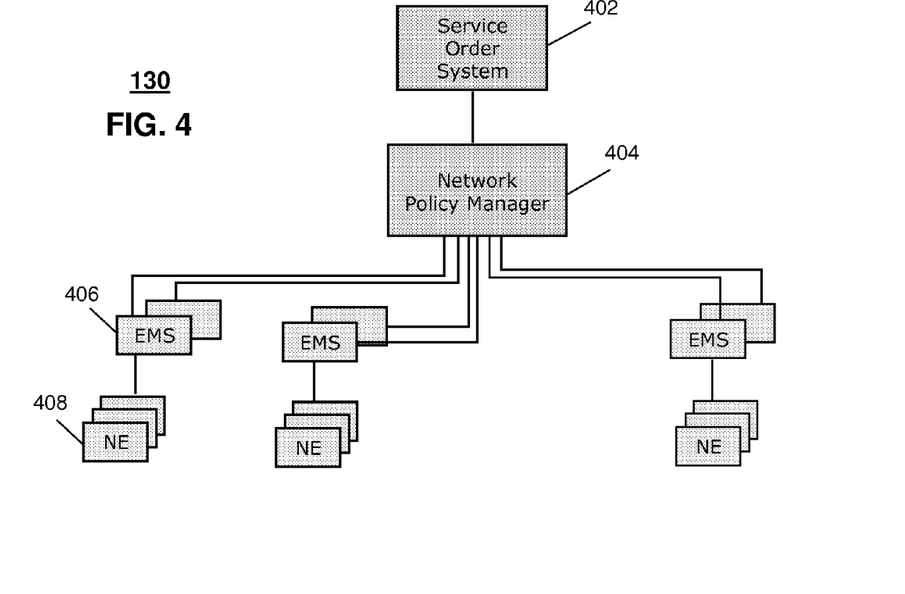
FIG. 4 depicts an exemplary block diagram of a service processing system of the communication system.

FIG. 3 depicts an exemplary method 300 operating in portions of communication systems 100-200. To assist in the description of method 300, a block diagram of the service processing system 130 is presented in FIG. 4. The service processing system 130 can comprise a service ordering system (SOS) 402, a network policy manager (NPM) 404, a plurality of element management systems (EMS) 406, and one or more network elements (NEs) 408 managed by the EMSs. The SOS 402 utilizes common computing and storage management technologies for processing subscriber video, voice, and/or Internet service requests and generating service orders therefrom. The NPM 404 utilizes common computing technology for generating service policies for provisioning the NEs 408 to effectuate the service orders generated by the SOS 402. The EMS 406 serves as an intermediary device for processing and configuring the NEs 408 with the policies generated by the NPM 404. The EMSs 406 can be hosted on NEs 408 or can operate independently as shown in FIG. 4. The NEs 408 can represent any network element of communication systems 100 and 200 (e.g., routers, gateways, servers, and so on).

With these principles in mind, method 300 begins with step 302 in which one or more base policy templates and a plurality of atomic templates are manually created on each EMS 406 during installation (or build-out) of one or more NEs 408 of communication systems 100 or 200. Each base policy template defines an operating baseline for the one or more NEs 408 regardless of the service options applied to enable a service request of a subscriber. The base policy template represents a minimum policy configuration a service provider requires for a subscriber to gain access to backend systems of communication systems 100 or 200 for discovery, authentication, validation, and so on.

An example of a baseline policy is portal redirect policy. For example, the NEs 408 can be configured with a base policy template for redirecting a subscriber to a policy abuse portal. A policy abuse portal informs a subscriber that they have violated one or more of the use of service policies established by the service provider. In another embodiment, a portal redirection policy can be applied to the NEs 408 for redirecting a subscriber to an account suspension portal. An account suspension portal can be used to inform a subscriber that s/he no longer has access to one or more network services until a billing issue is resolved. In yet another embodiment, a policy for portal redirection can be applied to the NEs 408 for directing subscribers to a registration portal. For new subscribers, a registration portal can be used to obtain information about a subscriber prior to allowing full access to a particular set of services. Once the information is received, the subscriber has the redirection disabled. The foregoing redirection policies can be applied singly or in combination to the NEs 408.

Base policy templates can thus define any number of policies associated with portal redirection. Additionally, base policy templates can be used to define policies for baseline security and quality of service (QoS) operations. For instance a service provider can require that each subscriber have a baseline anti-spoofing policy configured in the network for ingress traffic after an IP address is assigned to a gateway 104 at the subscriber's home. The anti-spoofing policy can be used to filter all packets from the subscriber's access port with an unauthorized source IP addresses. A QoS baseline policy can also be established to guarantee a minimum quality of service, operational bandwidth, and like operational criteria for video, voice and Internet services.

Figure 5:
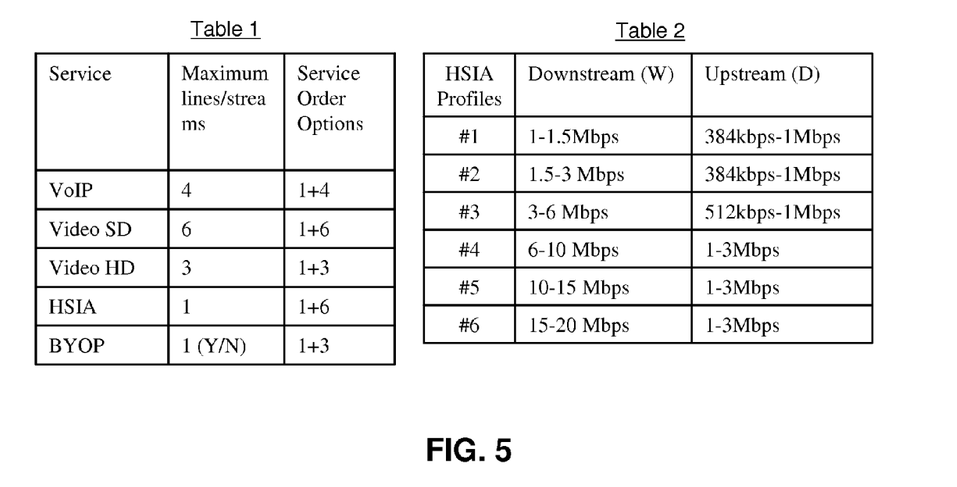
FIG. 5 depicts tables with exemplary service options of the communication systems.

FIG. 5 depicts an exemplary table of voice (VoIP), video (SDTV or HDTV), high-speed Internet access (HSIA), and bring your own portal (BYOP) services that can be offered by a service provider of communication systems 100 or 200. In particular, Table 1 illustrates the number of service lines that can be offered to a subscriber for triple play services: 0 to 4 VoIP lines, 0 to 6 SDTV lines, 0 to 3 HDTV lines, 0 to 1 of 6 HSIA speeds, and an option to turn on or off a BYOP default portal setting. Based on the information provided in these tables, there are a total of 979 service bundle permutations (5*7*4*7−1) of VoIP, SDTV, HDTV, and HSIA services. In addition for each service bundle with HSIA there are 4 options for BYOP. Accordingly, there are 139 (5*7*4−1) service bundles without HSIA service and (979−139)*4 service bundles with HSIA service. Thus the total service bundle permutations in the present example is (139+840*4)=3499.

With this many permutations establishing service policies manually can be time consuming and error prone. The atomic policy templates retrieved from the EMS 406 and recorded by the NPM 404 in steps 304-306 can be used to automate the provisioning of NEs 408 to effectuate any combination of these triple play services. Each atomic policy template can define a security and/or QoS policy for any one of the possible services just mentioned. When an agent of the communication systems 100 or 200 enters a service request of a subscriber, a service order is created in step 308. If the service order defines a new service bundle not previously deployed by the NPM 404, the NPM proceeds to step 312 where it retrieves at least one base policy template and at least one atomic policy template from its database. The selection of these templates is determined from the service bundle defined in the service order.

Figure 6:
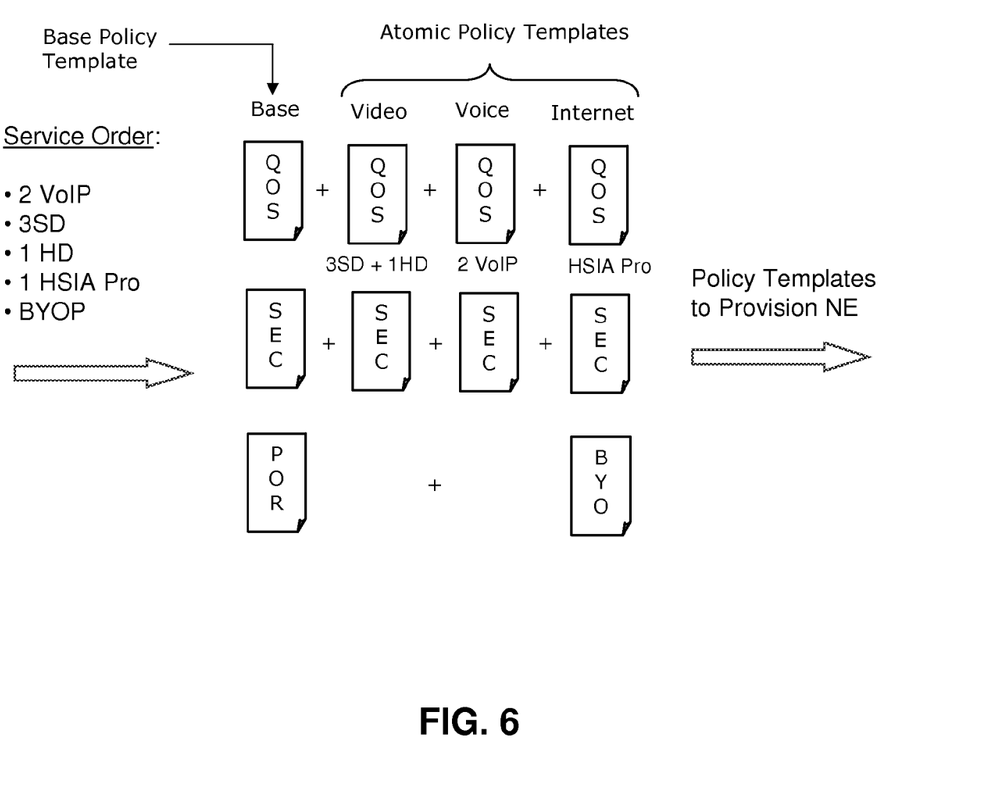
FIG. 6 depicts an exemplary process for provisioning the communication systems according to the method of FIG. 3.

FIG. 6 depicts an exemplary process for provisioning NEs 408 of the communication systems 100 or 200 according to an example of a particular service order combination of FIG. 5. In this illustration, a service order of the subscriber includes 2 VoIP lines, 3 SDTV lines, 1 HDTV line, 1 HSIA pro (option #6 of FIG. 5), and a default portal preference specified by the subscriber as a BYOP option (e.g., Google, Yahoo, etc.). In this illustration, the NPM 404 retrieves according to the service order a base policy template, and three atomic policy templates as shown in FIG. 6. The base policy template provides a baseline QoS policy, a baseline security policy, and a baseline portal redirection policy (POR). As noted earlier, the QoS, security and POR policies can define baseline operating policies for the NEs 408 which are applied independently from the service bundle chosen by the service provider.

There are three atomic policy templates which are combined with the base policy template. Specifically, there is one atomic policy template for the video service bundle, one atomic policy template for the VoIP service bundle, and one atomic policy template for the HSIA and BYOP service bundle. Each atomic policy template includes its own QoS and security definitions to direct the EMSs 406 to provision in step 314 the NEs 408 for each particular service. The QoS and security definitions need not be the same for video, voice or Internet service.

For example, the QoS settings for VoIP service can be more stringent than the QoS settings for Internet service. This is because VoIP services rely on real-time transmission of packets. Accordingly, packet losses due to buffer overruns, jitter, or like network distortions can severely affect the quality of VoIP services. Internet service on the other hand is much more tolerant of such distortions since retransmissions can occur in non-real-time. Since IPTV communications is also a real-time service, QoS is likely to have stricter requirements than the QoS setting for the HSIA service.

Similarly, differences can be present in the security settings for video, voice and Internet service. The security settings for Internet service can include an anti-spoofing policy while video and voice security policies can be used for denying users access to unsubscribed services. These policies can also restrict the potential for denial of service (DoS) attacks on services that are not available, or DoS attacks caused by unauthorized parties (often referred to as "hackers") attempting to impact the operations of NEs 408 with malicious software.

FIG. 6 thus provides an exemplary scenario of a service order which is executed by the NPM 404 by means of a base policy template and three atomic policy templates retrieved from its database. The provisioning of NEs 408 with these templates can be accomplished by automation means involving no manual intervention as in prior art systems.

Referring back to step 310, the NPM 404 can cache templates associated with service orders. Accordingly, if a particular service order has already been provisioned for a previous subscriber, the NPM 404 can proceed to step 316 where it reuses the same policy configurations for another subscriber.

It would be evident to an artisan with ordinary skill in the art that the aforementioned embodiments can be modified, reduced, or enhanced without departing from the scope and spirit of the claims described below. For example, base policy templates as well as atomic policy templates can utilize other suitable policy configurations not describe by the present disclosure. Additionally, base and atomic policy templates can differ between telecommunications service carriers. Moreover, other suitable present and future QoS, portal redirection, and security policies can be applied to the present disclosure.

Other modifications can be applied to the present disclosure without departing from the scope of the claims. Accordingly, the reader is directed to the claims below for a fuller understanding of the breadth and scope of the present disclosure.

Figure 7:
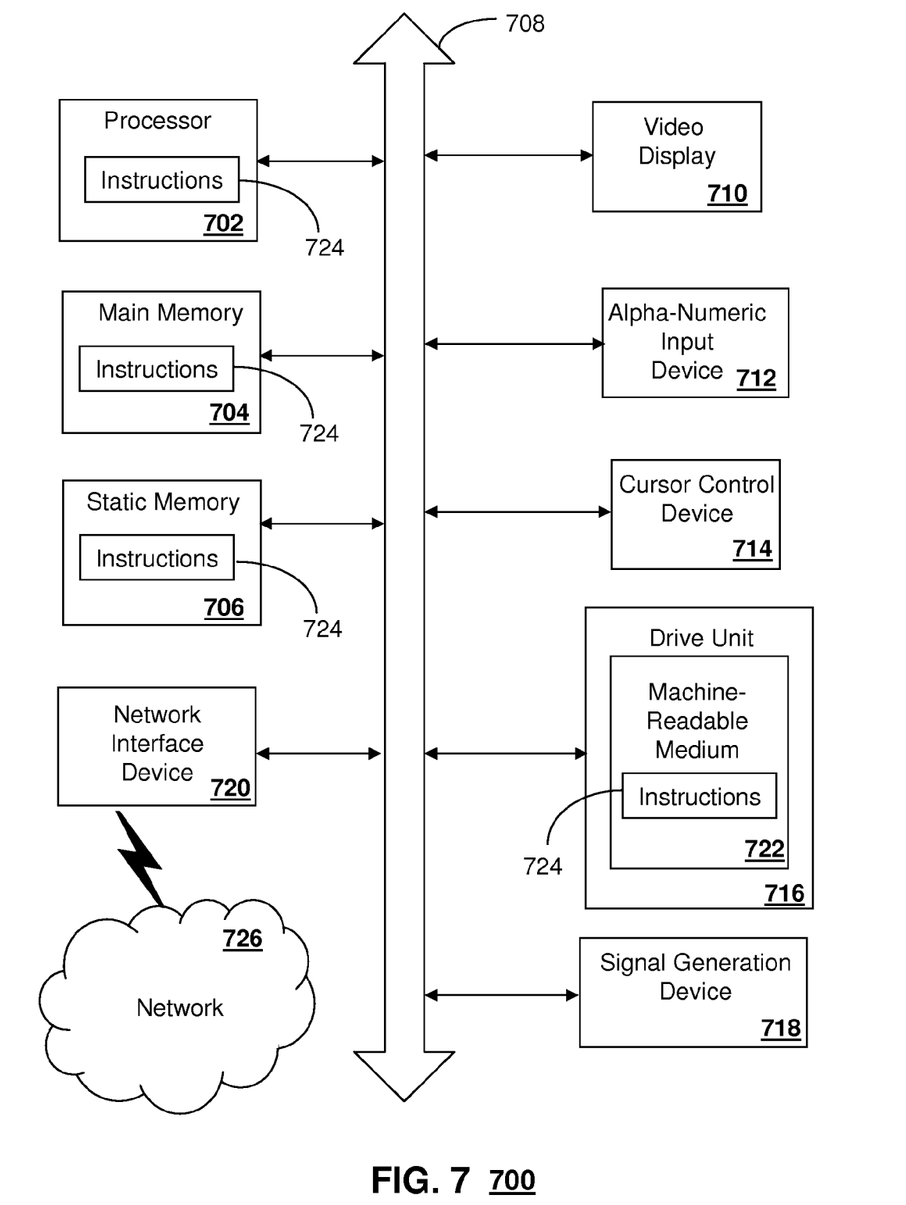
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: computer-readable storage medium, solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in a network policy manager, comprising computer instructions for:

recording a plurality of atomic policy templates for provisioning one or more network elements of a communication system, wherein each of the plurality of atomic policy templates correspond to one among a plurality of service configurations of the one or more network elements and is dependent on service options applied to enable a service request of a subscriber;

recording one or more base policy templates for provisioning the one or more network elements, wherein each of the one or more base policy templates correspond to an operating baseline of the one or more network elements and is independent of service options applied to enable a service request of the subscriber, wherein the operating baseline is a minimum configuration required for the subscriber to access a backend system of the communication system, and wherein at least one of the one or more base policy templates is combined with at least one of the plurality of atomic templates when provisioning the one or more network elements;

receiving a service order associated with a select one of the plurality of services configurations requested by the subscriber;

retrieving according to the service order at least one base policy template and at least one atomic policy template; and provisioning the one or more network elements according to the at least one base policy template and the at least one atomic policy template.

2. The storage medium of claim 1, comprising computer instructions for retrieving from one or more element management systems (EMSs) that manage the one or more network elements, the one or more base policy templates, and the plurality of atomic policy templates.

3. The storage medium of claim 1, wherein the service order is generated by a service order system (SOS) that processes one or more service requests of the subscriber.

4. The storage medium of claim 1, wherein each of the one or more base policy templates comprise one or more configurable options for portal redirection, security and quality of service (QoS).

5. The storage medium of claim 4, wherein portal redirection corresponds to at least one among directing the subscriber to a policy abuse portal, an account suspension portal, and a registration portal.

6. The storage medium of claim 1, wherein each of the plurality of service configurations of the one or more network elements correspond to a permutation of at least one among one or more video services, one or more voice services and one or more Internet services.

7. The storage medium of claim 6, wherein each of the plurality of atomic policy templates comprise one or more configurable options for security, quality of service (QoS) and an option to identify a preferred default portal applied to one among the plurality of service configurations.

8. The storage medium of claim 6, wherein the one or more video services are supplied by an Internet Protocol Television (IPTV) system that supports at least one among a standard definition television (SDTV) service, and a high definition television (HDTV) service, and wherein the one or more voice services are supplied by an Internet Protocol Multimedia Subsystem (IMS) system that supports a Voice over IP (VoIP) service and a Public Switched Telephone Network (PSTN) service.

9. A network policy manager (NPM), comprising a controller element to provision one or more network elements in a communication system with at least one base policy template and at least one atomic policy template retrieved from one or more base policy templates and a plurality of atomic policy templates according to a service order of a subscriber, wherein the at least one base policy template corresponds to an operating baseline of the one or more network elements, and the at least one atomic policy template corresponds to one among a plurality of service configurations of the one or more network elements, wherein the atomic policy template is dependent on service options applied to enable a service request of the subscriber, wherein the base policy template is independent of service options applied to enable a service request of the subscriber, and wherein the operating baseline is a minimum configuration required for the subscriber to access a backend system of the communication system.

10. The NPM of claim 9, wherein the controller element is adapted to retrieve from one or more element management systems (EMSs) that manage the one or more network elements the one or more base policy templates and the plurality of atomic policy templates and records them.

11. The NPM of claim 9, wherein the service order is generated by a service order system (SOS) that processes one or more service requests of the subscriber.

12. The NPM of claim 9, wherein each of the one or more base policy templates comprise one or more configurable options for portal redirection, security and quality of service (QoS).

13. The NPM of claim 12, wherein portal redirection corresponds to at least one among directing the subscriber to a policy abuse portal, an account suspension portal, and a registration portal.

14. The NPM of claim 9, wherein each of the plurality of service configurations of the one or more network elements correspond to a permutation of at least one among one or more video services, one or more voice services and one or more Internet services.

15. The NPM of claim 14, wherein each of the plurality of atomic policy templates comprise one or more configurable options for security, quality of service (QoS) and an option to identify a preferred default portal applied to one among the plurality of service configurations.

16. The NPM of claim 14, wherein the one or more video services are supplied by an Internet Protocol Television (IPTV) system that supports at least one among a standard definition television (SDTV) service, and a high definition television (HDTV) service, and wherein the one or more voice services are supplied by an Internet Protocol Multimedia Subsystem (IMS) system that supports a Voice over IP (VoIP) service and a Public Switched Telephone Network (PSTN) service.

17. A network element, comprising a controller element to receive provisioning information from a network policy manager (NPM) in the form of at least one base policy template and at least one atomic policy template selected by the NPM from one or more base policy templates and a plurality of atomic policy templates according to a service order of a subscriber, wherein the at least one base policy template corresponds to an operating baseline of the one or more network elements, and the at least one atomic policy template corresponds to one among a plurality of service configurations of the one or more network elements, wherein the atomic policy template is dependent on service options applied to enable a service request of the subscriber, wherein the base policy template is independent of service options applied to enable a service request of the subscriber, and wherein the operating baseline is a minimum configuration required for the subscriber to access a backend system of the communication system.

18. The network element of claim 17, wherein each of the one or more base policy templates comprise one or more configurable options for portal redirection, security and quality of service (QoS), and wherein portal redirection corresponds to at least one among directing the subscriber to a policy abuse portal, an account suspension portal, and a registration portal.

19. The network element of claim 17, wherein each of the plurality of service configurations of the one or more network elements correspond to a permutation of at least one among one or more video services, one or more voice services and one or more Internet services, and wherein each of the plurality of atomic policy templates comprise one or more configurable options for security, quality of service (QoS) and an option to identify a preferred default portal applied to one among the plurality of service configurations.

20. The network element of claim 19, wherein the one or more video services are supplied by an Internet Protocol Television (IPTV) system that supports at least one among a standard definition television (SDTV) service, and a high definition television (HDTV) service, and wherein the one or more voice services are supplied by an Internet Protocol Multimedia Subsystem (IMS) system that supports a Voice over IP (VoIP) service and a Public Switched Telephone Network (PSTN) service.

* * * * *